(12) United States Patent
Segalen (10) Patent No.: US 10,225,027 B2
(45) Date of Patent: Mar. 5, 2019

(54) DEVICE AND METHOD FOR CALIBRATING A WIDEBAND RADIO FREQUENCY RECEIVE CHAIN

(71) Applicant: THALES, Courbevoie (FR)

(72) Inventor: Rémi Segalen, Brest (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 15/872,901

(22) Filed: Jan. 16, 2018

(65) Prior Publication Data

US 2018/0145773 A1 May 24, 2018

Related U.S. Application Data

(63) Continuation of application No. PCT/EP2016/067521, filed on Jul. 22, 2016.

(30) Foreign Application Priority Data

Jul. 23, 2015 (FR) .................................... 15 01577

(51) Int. Cl.
| | |
|---|---|
| *H04B 17/12* | (2015.01) |
| *H04B 17/13* | (2015.01) |
| *H04B 17/21* | (2015.01) |
| *H04B 17/27* | (2015.01) |
| *H04B 17/24* | (2015.01) |

(52) U.S. Cl.
CPC ............. *H04B 17/12* (2015.01); *H04B 17/13* (2015.01); *H04B 17/21* (2015.01); *H04B 17/27* (2015.01); *H04B 17/24* (2015.01)

(58) Field of Classification Search
CPC ................................ H04B 17/12; H04B 17/21
See application file for complete search history.

(56) References Cited

U.S. PATENT DOCUMENTS

| | | | |
|---|---|---|---|
| 6,700,537 B2 | 3/2004 | Dufour et al. | |
| 9,673,917 B2 * | 6/2017 | Conroy | ................. H04B 17/21 |
| 2001/0012770 A1 | 8/2001 | Pol | |
| 2009/0298422 A1 | 12/2009 | Conroy et al. | |

OTHER PUBLICATIONS

Search Report from related Application No. FR 1501577, dated May 17, 2016.

* cited by examiner

*Primary Examiner* — Tuan H Nguyen (74) *Attorney, Agent, or Firm* — Knobbe, Martens, Olson & Bear, LLP (57) ABSTRACT

A device and method for calibrating a wideband radio frequency receive chain are disclosed. In one aspect, the device includes a wideband radio frequency receive chain and a processing module configured to perform a spectral analysis. The receive chain includes an input block and a radio frequency processing assembly. The device is configured to implement a first calibration phase of the input block and a second calibration phase of the receive chain.

13 Claims, 4 Drawing Sheets

DEVICE AND METHOD FOR CALIBRATING A WIDEBAND RADIO FREQUENCY RECEIVE CHAIN

CROSS-REFERENCE TO RELATED APPLICATIONS

This application is a continuation of International Application No. PCT/EP2016/067521, filed Jul. 22, 2016, which claims the benefit under 35 U.S.C. § 119 of French Application No. 15 01577, filed Jul. 23, 2015, each of which is herein incorporated by reference in its entirety.

BACKGROUND

Technological Field

The described technology generally relates to a device and method for calibrating the measurement of the power of signals with a wideband radio frequency receive chain.

The described technology is particularly applicable in the field of wideband amplitude radiogoniometry for localizing emission sources in radio frequency bands.

Description of the Related Technology

A radio frequency receive chain is branched at the output of a receiving antenna and comprises an input block and a set of hardware modules and digital computation capability, for example a computation processor.

In the field of radiogoniometry, several receiving antennas and several receive chains are used to allow the measurement of the arrival direction of the signal coming from an emission source. In this field, several techniques exist. One of these is commonly used due to the simplicity of its implementation; this is amplitude radiogoniometry. The latter is based on the use of the power of the signals delivered by an array of directional antennas, the pointing of which is generally evenly distributed over the angular range of interest, very generally 360° in the horizontal plane to measure the relative bearing. For this radiogoniometry, it is necessary to have good measuring precision of the power of the radio frequency signal received by each receiving antenna. However, each receive chain causes its own specific measuring imprecisions. In order to obtain good measuring precision, it is necessary to calibrate each radio frequency receive chain.

A wideband receive chain is made up of a set of several processing modules, connected to one another by cables that may be several meters long.

It is known to use a system for injecting and measuring a calibration signal, which requires a wideband radio frequency signal generator injected at the input of the receive chain and a device for measuring the power of said radio frequency signal at the input and output of the receive chain. Such a system is complex and cumbersome.

U.S. Pat. No. 6,700,537 B1 describes a system for calibrating a wideband radio frequency receiver of a location system, including at least two processing channels. This patent proposes to use a single noise source for the calibration, the noise being distributed over the processing channels. This calibration system requires a system for distributing the noise toward the various channels and allows only a relative calibration between the various channels used.

SUMMARY OF CERTAIN INVENTIVE ASPECTS

Certain aspects of the described technology aim to resolve the aforementioned drawbacks, by proposing a calibration method and device for a wideband radio frequency receive chain, which are less complex and have better calibration precision than the known systems.

To that end, one aspect relates to a method for calibrating the power of a wideband radio frequency receive chain, able to receive an input radio frequency signal from a receiving antenna, in a frequency band, implemented in a calibration device comprising said wideband radio frequency receive chain and a capability able to perform a spectral analysis, said receive chain including an input block connected at the input of a radio frequency processing assembly, the method comprising:

a first calibration phase of the input block, comprising, for at least one temperature value of said input block and a frequency, generating a given power spectral density of noise, using a noise source able to be selected and controlled from the input block, then computing and storing at least one equivalent power spectral density of noise returned at the input of the input block, a second calibration phase for the power gain of the receive chain comprising: generating a given power spectral density of noise; measuring a power spectral density of noise at the output of the receive chain; computing a power gain of the receive chain as a function of the power spectral density of noise at the output of the receive chain and the equivalent power spectral density of noise returned at the input corresponding to the given power spectral density of noise.

Advantageously, the use of a noise source in the input block of a receive chain allows a more precise power calibration of the receive chain, while minimizing the induced hardware complexity.

The method according to the described technology may also have one or more of the features below:

in the first calibration phase of the input block, the computation comprises: obtaining a power gain of the input block for said temperature value and said frequency; generating a noise having a given power spectral density of noise and measuring a power spectral density of noise at the output of the input block; computing an equivalent power spectral density of noise returned at the input of said input block as a function of the power gain of the input block and the power spectral density of noise at the output of the input block.

the first calibration phase of the input block is repeated for a plurality of frequencies in the frequency band of the receive chain and/or a plurality of temperature values of the input block.

the capability configured to perform a spectral analysis being a processing module of the radio frequency processing assembly, the measurement of the power spectral density of noise at the output of the receive chain is obtained at the output of said processing module.

the capability configured to perform a spectral analysis being a calibrated auxiliary receiver comprising a spectral analyzer and the receive chain including an output block connected to the output of the radio frequency processing assembly, able to switch between a first position for conveying the radio frequency signal toward a primary output of the receive chain and a second position for conveying the radio frequency signal toward an auxiliary output of the receive chain, on which the calibrated auxiliary receiver is connected during calibration, the method further includes a first phase for calibration of the output block, consisting of computing a gain deviation between said primary output and said auxiliary output, for at least the frequency and the temperature value of the input block considered in the first step for calibration of the input block, and, in the second phase, the step for computing the power gain of the receive chain also accounting for said gain deviation introduced by the output block.

Another aspect relates to a device for calibrating the power of a wideband radio frequency receive chain, comprising a wideband radio frequency receive chain able to receive an input radio frequency signal from a receiving antenna, in a frequency band, the receive chain including an input block, a radio frequency processing assembly, and a capability configured to perform a spectral analysis, characterized in that the input block includes a noise source connected at the input of a switching member able to connect the noise source to the input of a block of downstream circuits of the input block, the output of said block of downstream circuits being connected at the input of the radio frequency processing assembly, the device enabling the implementation of a calibration method according to the preceding method.

The device according to the described technology may also have one or more of the features below:

said receive chain having a specific background noise, the power of the noise introduced by said noise source is greater than the power of said background noise specific to the receive chain.

the switching member is a switch able to switch between a first position for injecting, in the block of downstream circuits of the input block, the input radio frequency signal, and a second injection position, in the block of downstream circuits of the input block, noise generated by the noise source.

said noise source is a noise diode.

the capability configured to perform a spectral analysis is a processing module with which the radio frequency processing assembly is provided, the measurement of the power spectral density of noise at the output of the receive chain being obtained at the output of said processing module.

the device further includes an output block, connected to the output of the radio frequency processing assembly, comprising a switching member able to switch between a first position for conveying the radio frequency signal toward a primary output of the receive chain and a second position for conveying the radio frequency signal toward an auxiliary output of the receive chain (60), the capability configured to perform a spectral analysis being a calibrated auxiliary receiver comprising a spectral analyzer and connected, during the calibration, to the auxiliary output.

Yet another aspect also relates to a radiogoniometry device comprising a plurality of wideband radio frequency receive chains, each connected to a receiving antenna, and a computation unit able to compute an angle of incidence of a radio frequency signal received by said receiving antennas, characterized in that it includes, for each of said receive chains, a power calibration device according to the preceding device.

BRIEF DESCRIPTION OF THE DRAWINGS

Other features and advantages of the described technology will emerge from the description thereof provided below, for information and non-limitingly, in reference to the appended figures, in which.

DETAILED DESCRIPTION OF CERTAIN INVENTIVE EMBODIMENTS

Figure 1:
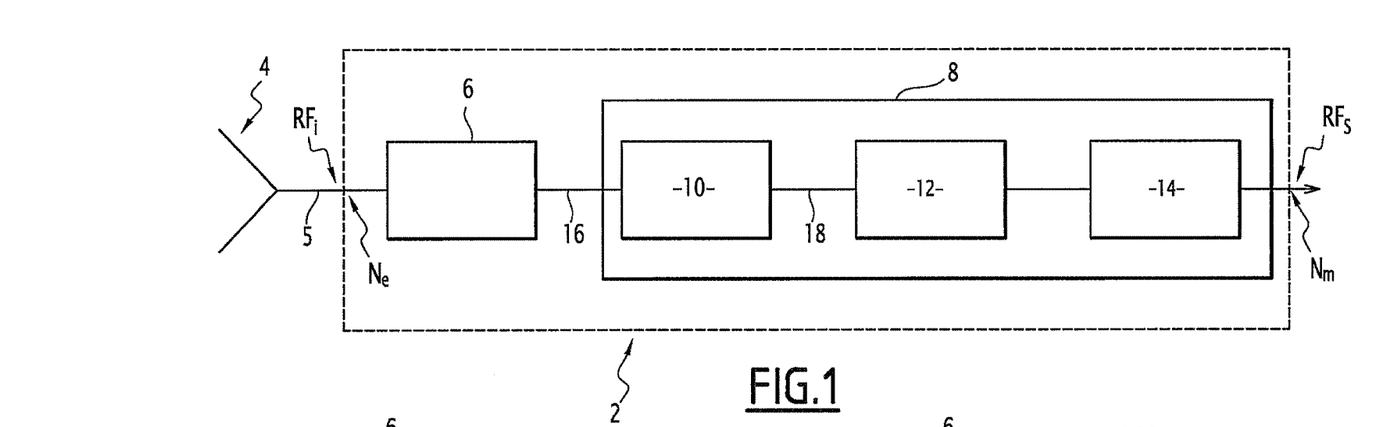
FIG. 1 schematically shows a power calibration device for a wideband receive chain according to a first embodiment.

FIG. 1 schematically illustrates a device for calibrating a wideband radio frequency receive chain 2. In this example, this is a superheterodyne receiver followed by a spectral analysis.

The receive chain 2 is connected as output of an antenna 4, and comprises several connected modules, including an input block 6, normally connected as close as possible to the antenna.

In one embodiment, the input block 6 is connected as output of the antenna 4 by a cable 5, the length of which is about 0 to 20 centimeters.

The output of the input block 6 is connected to a radio frequency processing assembly 8, comprising hardware modules and digital computation capability.

The radio frequency processing assembly 8 comprises, in this example, a frequency change (transposition) module 10, able to convert a radio frequency signal RF with a first given frequency into a signal with a second frequency FI, called intermediate frequency, generally lower than the first frequency.

At the output of the frequency change module 10, an analog-digital converter 12 is connected, at the output of which a signal processing module 14 is connected, able to perform a spectral analysis processing operation. In one embodiment, the signal processing module 14 is an FPGA located on the same electronic board as the analog-digital converter 12.

The various modules making up the receive chain 2 are connected via cables 16, 18, the cumulative length of which may exceed approximately ten meters. These cables cause power losses of the radio frequency signal.

Let $RF_i$ be the radio frequency signal at the input of the receiver 2, and RFs the radio frequency signal at the output of the receiver 2.

The radio frequency receive chain 2 is able to operate in a frequency band $[F_1, F_2]$, for example from 2 to 18 GHz.

The power of the signal is measured at the end of the receive chain, such that knowing the power gain of this receive chain makes it possible to deduce the power of the signal at the input of said chain.

The described technology indeed makes it possible to compute the power gain of a receive chain, for various frequency and temperature values of the input block 6, as explained in detail below.

This power gain corresponds to the ratio of the output power $P_s$ to the input power $P_i$. It may be expressed in decibels (dB) as follows:

$$G_{dB} = 10\log\left(\frac{P_s}{P_i}\right) = 10\log(P_s) - 10\log(P_i)$$

Where log( ) is the base 10 logarithmic function.

In other words, the power gain of the receive chain is the difference between the power of the output signal and the power of the input signal, both expressed in logarithmic units.

The power of the output signal is calculated at the end of the spectral analysis. It is the square of the modulus of the complex signal, within the mathematical meaning, corresponding to a frequency step or Fourier transform box.

The power gain of a receive chain 2 as schematically shown in FIG. 1 depends, inter alia, on the installed cables 16, 18 and the temperature of the various electronic blocks 6, 10, 12. The calibration may ideally be redone upon each significant temperature change indicated by a sensor integrated into one of the blocks. Otherwise, it may only be done upon initialization of the system, assuming that the differential gain deviations related to the temperature change are small.

The receive chain has its own background noise, depending on various components of this receive chain. This specific noise of the receive chain is not known precisely; nevertheless, it is possible to determine a maximum specific noise level of the receiver.

Figure 2:
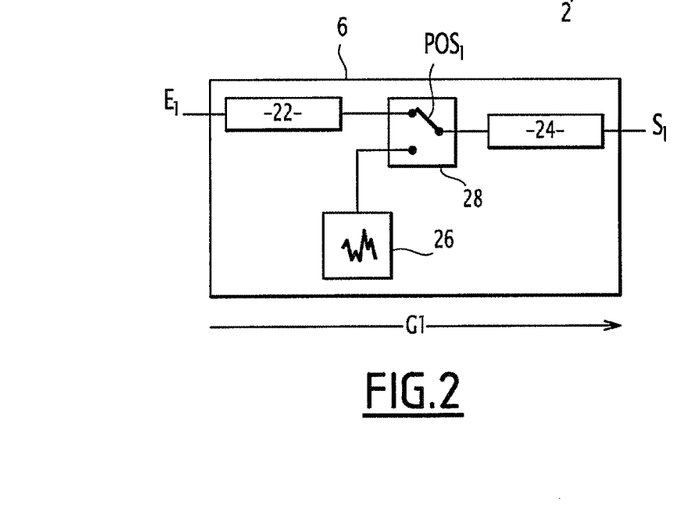
FIGS. 2 and 3 schematically show the main modules of an input block of a wideband receive chain according to a first embodiment.
Figure 3:
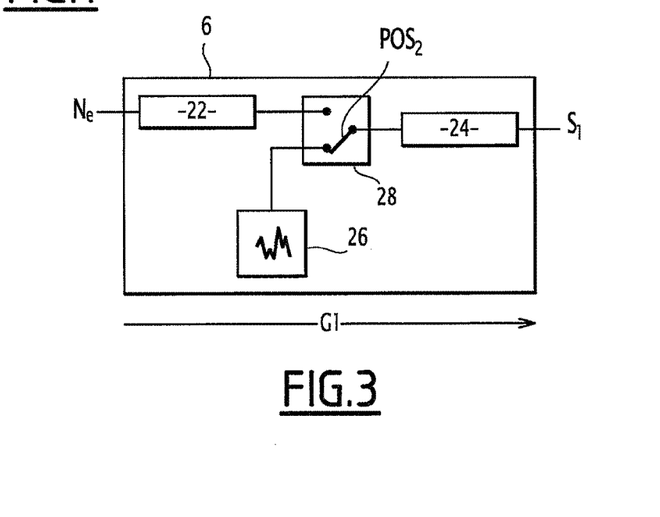

In one embodiment of the calibration device of the described technology, illustrated in FIGS. 2 and 3, the input block 6 of a wideband radio frequency receive chain 2 comprises a block 22 of upstream circuits and a block 24 of traditional downstream circuits. For example, the block 22 comprises a frequency band limitation filter and protective circuits with respect to strong signals, and the block 24 comprises amplifiers and variable attenuators. It is desirable to introduce the noise as far upstream as possible, therefore to limit the block 22 to a minimum of functions.

The input block 6 further comprises a noise source 26 and a switching member 28. These elements 26 and 28 are added to perform the calibration function.

The switching member 28 is for example a switch, which, when it is in a position $POS_2$, makes it possible to switch the circuit so as to inject the noise provided by the noise source 26 at the input of the block of downstream circuits 24.

Thus, the switching member 28 makes it possible to choose between the calibration mode of the receive chain 2 ($POS_2$), in which the noise is injected into the receiver 2 (illustrated in FIG. 3), and the nominal operating mode (illustrated in FIG. 2), in which the switch is in a position $POS_1$.

Alternatively, the switching member 28 is a coupler.

The noise source 26 provides a noise in a given spectral density calibration mode, the spectral density being a power per frequency bandwidth (expressed for example in dBm/MHz). The spectral density is therefore normalized.

The noise source 26 is a component added into the input block 6, having determined characteristics to obtain a good calibration precision.

In particular, the noise source 26 is chosen so as to provide a noise with a power higher than that of the noise specific to the receive chain.

For example, to obtain a precision of 0.5 dB, the noise power of the noise source 26 must be 10 dB higher than the noise power specific to the receive chain brought down to the input.

In one embodiment, to produce the noise source 26, a component is used of the wideband noise diode type having an ENR (excess noise ratio) of 30 dB.

Advantageously, such a component is very small.

Alternatively, an amplifier is used as noise source 26, its input being connected to an appropriate charge and its output delivering the desired noise.

Thus, the addition of such a component 26 and a switch 28 into the input block of a wideband radio frequency receive chain has a very small bulk.

Furthermore, when the switching member 28 is in the position $POS_1$ illustrated in FIG. 2, the receiver operates in nominal receiving mode without disruption.

In calibration mode, the noise source 26 is powered, the switching member 28 is in the position $POS_2$, and the noise is conveyed at the input of the downstream block 24.

Figure 4:
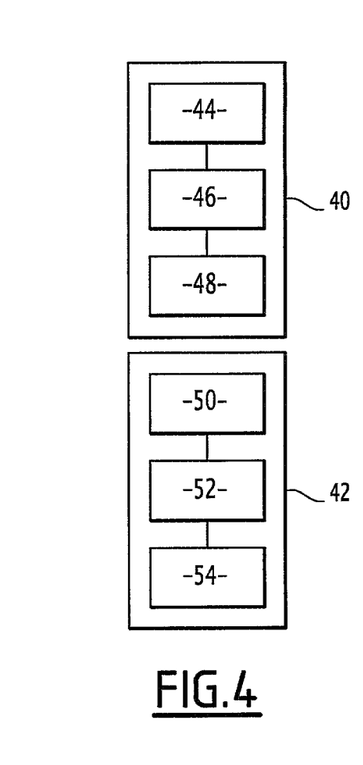
FIG. 4 is a flowchart of the main steps of a method for calibrating a wideband receive chain according to one embodiment.

FIG. 4 is a flowchart of the main steps of a method for calibrating the wideband receive chain according to one embodiment.

The method comprises two phases, a first phase 40 for calibrating the input block 6 with respect to the noise source and a second phase 42 for calibrating the entire receive chain.

During a first step 44 of the first phase 40, a calibration table of the input block, which provides the input-output power gain of this block, based on the frequency $F_i$ of the signal $Rf_i$ at the input in the temperature $T_k$ of the input block 6 is obtained.

One therefore has a first calibration table for the input block comprising power gain values of the input block $G_1(F_i, T_k)$.

This first table is established in the plant, by performing successive injections of radio frequency signals, and power measurements at the input and output of the input block.

Desirably, a set of temperature values $T_k$ ranging from −40° C. to +85° C. are considered, and a set of frequency values $F_i$ comprised in the frequency band of the receive chain, with a predetermined frequency pitch, for example of about 10 MHz.

Alternatively, a single temperature value corresponding to an anticipated use of the receiver is considered.

Next, during a step 46 for determining spectral density of noise, the switching member 28 is switched into calibration mode ($POS_2$) and the noise source 26 is powered.

The spectral density of noise $N_1(F_i, T_k)$ is measured at the output of the input block, for each frequency $F_i$ and each temperature $T_k$ of the first calibration table of the input block.

To carry out this step, a measuring instrument, for example a spectrum analyzer, is connected at the output of the input block.

During a step 48 for computing equivalent spectral density, one computes, for each measured output spectral density of noise $N_1(F_i, T_k)$, the equivalent spectral density brought down to the input of the input block, denoted $N_e(F_i, T_k)$: $N_e(F_i, T_k) = N_1(F_i, T_k) - G_1(F_i, T_k)$, as long as these expressions are expressed in logarithmic units that are consistent with respect to one another. The equivalent spectral density brought down to the input of the input block is therefore obtained through a mathematical computation.

These computed values are stored in a second calibration table of the input block.

The gain of the switching member 28 is supposed to be identical in both positions $POS_1$ and $POS_2$.

In the calibration phase 42 of the receive chain, during a step 50, the switching member 28 is in position $POS_2$ to be in the calibration mode, a noise coming from the noise source 26 being injected at the input of the block 24. The output spectral density of noise of the spectral analysis $N_m(F_i)$ is measured at each frequency $F_i$.

Knowing the temperature $T_k$ of the input block, and the input equivalent spectral density, the power gain of the receive chain is computed during a computation step 52 as follows:

$G_r(F_i,T_k)=N_m(F_i)-N_e(F_i,T_k)$, as long as these expressions are expressed in logarithmic units that are consistent with respect to one another.

The power gain values of the receive chain are stored in a calibration table of the receive chain.

In the nominal usage mode of the receiver, the stored power gain values of the receive chain are used to determine the power $P_i$ of a radio frequency signal $RF_i$ at an antenna output from the power $P_s$ measured at the output of the receive chain, as a function of the frequency f of the signal RF and the measured or estimated temperature T of the input block:

$P_i=P_s-G_r(f,T)$, as long as these expressions are expressed in logarithmic units that are consistent with respect to one another.

Figure 5:
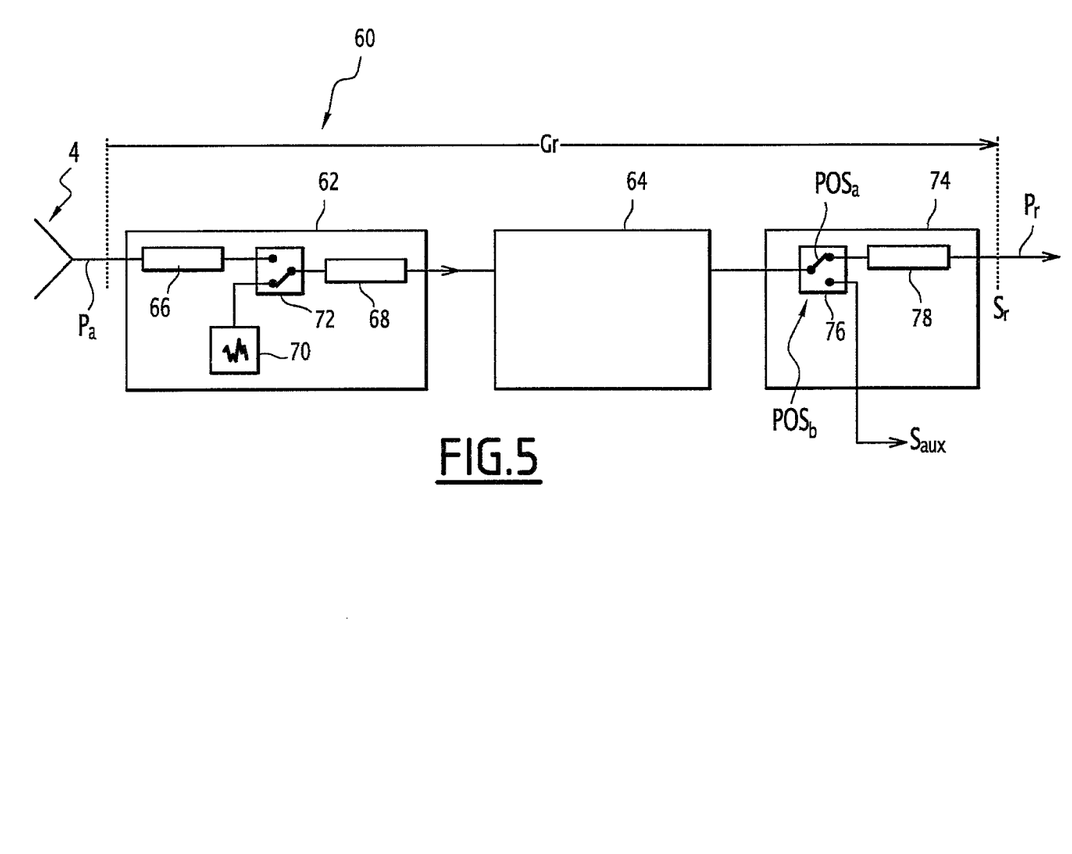
FIG. 5 schematically shows a device for calibrating a wideband receive chain according to a second embodiment.

FIG. 5 shows a device for calibrating a receive chain 60 that does not include spectral analysis.

The receive chain 60 includes an input block 62, which receives a radio frequency signal coming from an antenna 4, and a radio frequency processing assembly 64, able to include active and passive elements, including cables.

The input block 62 is similar to the input block 6 previously described.

In this embodiment, the input block 60 includes a block 66 of upstream circuits and a block 68 of downstream circuits, similar to the blocks 22 and 24 previously described.

It also comprises a noise source 70 and a first switching member 72.

The calibration device of FIG. 5 also comprises an output block 74 that is added to allow the calibration.

Figure 6:
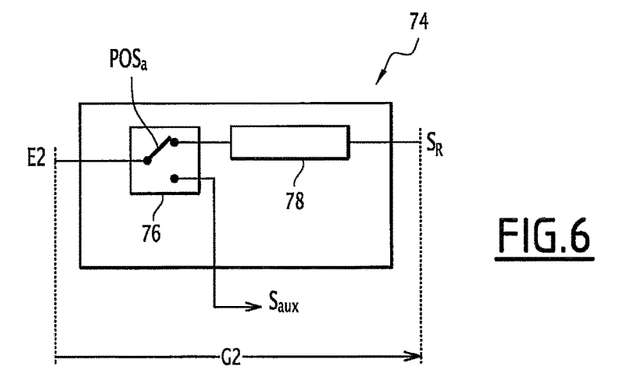
FIGS. 6 and 7 are the main modules of an output block of the calibration device of FIG. 5.

This output block 74 comprises a second switching member 76, able to switch between a first position $POS_a$ for conveying the radio frequency signal toward a downstream circuit module 78, the output $S_f$ of which provides the output radio frequency signal of the receiver. This position $POS_a$ corresponds to a nominal operating mode.

Figure 7:
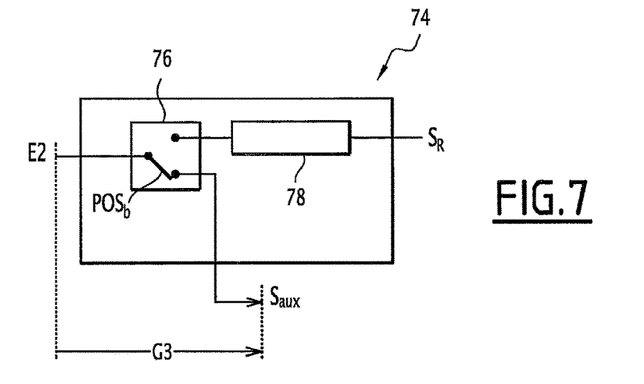

The second switching member 76 comprises a second position $POS_b$, which conveys the radio frequency signal toward an auxiliary output $S_{aux}$ on which, in the calibration mode, a calibrated auxiliary receiver is connected comprising a spectral analyzer.

To perform the calibration, a first calibration phase of the input 62 and output 74 blocks is carried out.

The input block 62 is similar to the input block 6 previously described.

To calibrate the output block 74, similarly to what was described for the calibration of the input block 6, first the second switching member 76 is placed in the position $POS_a$ and the power gain $G_2$ (FIG. 6) is measured between the input $E_2$ and the output $S_r$, as a function of the frequency and the temperature of the input block 62, in dB.

Next, the switching member 76 is in position $POS_b$, and the power gain $G_3$ is measured between the input $E_2$ and the auxiliary output $S_{aux}$ as a function of the frequency and the temperature of the input block 62, in dB.

The gain deviation $G_4$ in dB, between the main output and the auxiliary output, for the considered frequencies and temperatures of the input block, is computed and stored in a calibration table of the output block, or therefore:

$G_4(F_i,T_k)=G_2(F_i,T_k)-G_3(F_i,T_k)$.

Next, in a second phase, the entire receive chain is calibrated.

Figure 8:
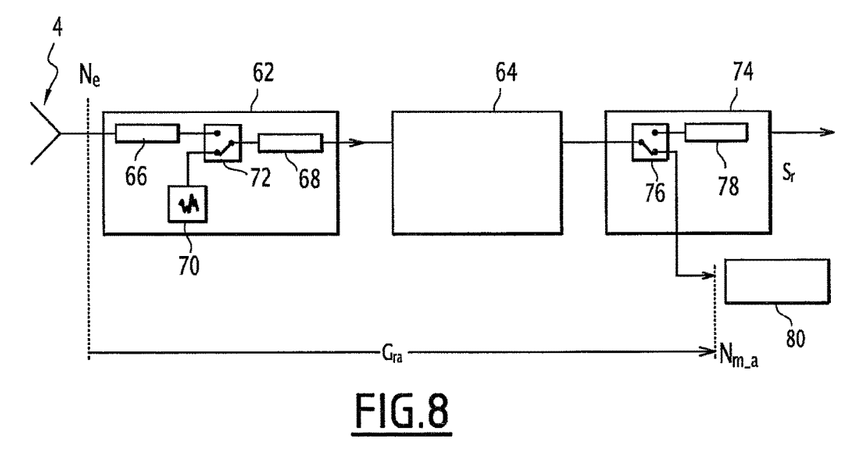
FIG. 8 schematically shows the device for calibrating a wideband receive chain of FIG. 5 in calibration mode.

The input 62 and output 74 blocks are placed in calibration mode via the respective switching members 72 and 76, as illustrated in FIG. 8.

To carry out this step, a calibrated measuring instrument, for example a spectrum analyzer, is connected at the auxiliary output of the output block 74.

As input, one injects the noise, via the noise source 70, with spectral density of noise $N_e(F_i,T_k)=N_1(F_i,T_k)-G_1(F_i,T_k)$.

As output, one measures the output spectral density of noise $N_{ma}(F_i)$.

One then computes $G_{ra}(F_i,T_k)=N_{ma}(F_i)-N_e(F_i,T_k)$.

In this embodiment, the power gain of the receive chain is given by:

$G_r(F_i,T_k)=G_{ra}(F_i,T_k)+G_4(F_i,T_k)$

The power gain values of the receive chain, for given frequency $F_i$ and temperature $T_k$ values, are stored in a calibration table of the receive chain.

In the nominal usage mode of the receiver 60, the stored power gain values of the receive chain are used to determine the power $P_e$ of a radio frequency signal RF at an antenna output from the power $P_r$ measured at the output of the receive chain, as a function of the frequency f of the signal RF and the measured or estimated temperature T of the input block:

$P_e=P_r-G_r(f,T)$

The described technology is particularly applicable in the field of amplitude radiogoniometry, making it possible to establish the angle of arrival θ of a radio frequency signal in a given coordinate system, for example the coordinate system of a carrier, such as an aircraft or a ship, on which the radiogoniometer is placed.

A radio goniometer uses n directional antennas, n being greater than or equal to 2.

Figure 9:
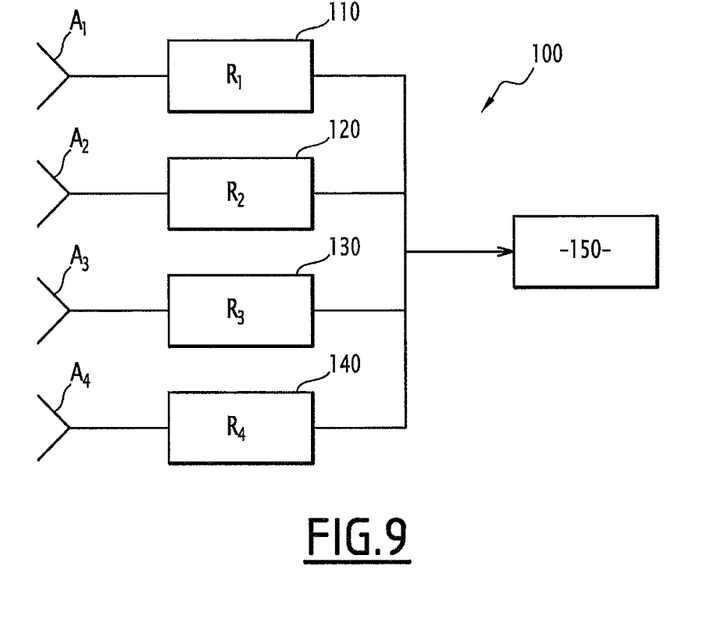
FIG. 9 schematically shows a radiogoniometry according to one embodiment.

For example, a radio goniometer 100 with four antennas and four receive chains is schematically illustrated in FIG. 9

Each of the receive antennas A1 to A4 is oriented along a predetermined receiving angle in a coordinate system, for example at +45 degrees, +135 degrees, +225 degrees and +315 degrees.

An incident radio frequency signal RF is received by these four antennas A1 to A4; their differences in orientation cause them to deliver different powers.

A respective receive chain 110, 120, 130 and 140 is connected at the output of each antenna, and the power of the signals respectively received makes it possible to compute the angle of arrival θ of the incident radio frequency signal RF. The computation is done by a computation module 150.

The computation is done using any known amplitude radiogoniometry method.

The precision of the computed angle depends on the quality of the measurement of the power of each receive chain.

Advantageously, each receive chain 110, 120, 130 and 140 is calibrated by applying one of the embodiments described above.

Thus, for each receive chain, power gain $G_{r,i}$ calibration tables are computed, with i going from 1 to 4 in the preceding example (four antennas), as a function of various frequency and temperature values.

The computed gain values $G_{r,i}$ are stored and provided to the module 150, which performs the computations.

Advantageously, the radiogoniometry precision is increased.

The described technology in particular applies to the gain calibration of wideband receive chains, including modules distributed over one or several tens of meters, in particular for the case where such receivers are already on board a carrier. Indeed, in this case, the access to certain modules of the receive chain is difficult. Advantageously, the described technology allows the calibration of the power gain of the entire receive chain without precise knowledge of its component modules, with the exception of input blocks 6 or 62 and output blocks 74.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method of power calibrating of a wideband radio frequency receive chain configured to receive an input radio frequency signal from a receiving antenna, in a frequency band, the method implemented in a calibration device comprising the wideband radio frequency receive chain and a spectral analyzer, the wideband radio frequency receive chain including an input block connected at an input of a radio frequency processing assembly, the method comprising:
   a first calibration phase of the input block, comprising, for at least one temperature value of the input block and a frequency, generating a given power spectral density of noise, using a noise source configured to be selected and controlled from the input block, and computing and storing at least one equivalent power spectral density of noise returned at an input of the input block; and
   a second calibration phase of a power gain of the wideband radio frequency receive chain, comprising:
   generating the given power spectral density of noise, measuring a power spectral density of noise at an output of the wideband radio frequency receive chain, and
   computing a power gain of the wideband radio frequency receive chain as a function of the power spectral density of noise at the output of the wideband radio frequency receive chain and the equivalent power spectral density of noise returned at the input of the input block corresponding to the given power spectral density of noise generated in the generating.

2. The method according to claim 1, wherein, in the first calibration phase of the input block, the computation comprises:
   obtaining a power gain of the input block for the temperature value and the frequency,
   generating a noise having a given power spectral density of noise and measuring a power spectral density of noise at the output of the input block, and
   computing an equivalent power spectral density of noise returned to the input of the input block as a function of the power gain of the input block and the power spectral density of noise at the output of the input block.

3. The method according to claim 1, further comprising repeating the first calibration phase of the input block for a plurality of frequencies in the frequency band of the wideband radio frequency receive chain.

4. The method according to claim 1, wherein the spectral analyzer is a processing module of the radio frequency processing assembly, and wherein the measurement of the power spectral density of noise at the output of the wideband radio frequency receive chain is obtained at the output of the processing module.

5. The method according to claim 1, wherein the spectral analyzer is a calibrated auxiliary receiver comprising a spectral analyzer and the wideband radio frequency receive chain including an output block connected to an output of the radio frequency processing assembly, configured to switch between a first position for conveying the radio frequency signal toward a primary output of the wideband radio frequency receive chain and a second position for conveying the radio frequency signal toward an auxiliary output of the wideband radio frequency receive chain, on which the calibrated auxiliary receiver is connected during calibration,
   the method further comprising a first phase for calibration of the output block, comprising computing a gain deviation between the primary output and the auxiliary output, for at least the frequency and the temperature value of the input block considered in the calibration of the input block, and, in the second phase, the computing of the power gain of the wideband radio frequency receive chain also accounting for the gain deviation introduced by the output block.

6. The method according to claim 1, further comprising repeating the first calibration phase of the input block for a plurality of temperature values of the input block.

7. A device for power calibrating of a wideband radio frequency receive chain, comprising a wideband radio frequency receive chain configured to receive an input radio frequency signal from a receiving antenna, in a frequency band, the wideband radio frequency receive chain including an input block, a radio frequency processing assembly, and a spectral analyzer,
   wherein the input block includes a noise source connected at an input of a switching member able to connect the noise source to an input of a block of downstream circuits of the input block, an output of the block of downstream circuits being connected at an input of the radio frequency processing assembly, the device configured to implement a calibration method comprising:
   a first calibration phase of the input block, comprising, for at least one temperature value of the input block and a frequency, generating a given power spectral density of noise, using the noise source configured to be selected and controlled from the input block, and computing and storing at least one equivalent power spectral density of noise returned at an input of the input block; and
   a second calibration phase of a power gain of the wideband radio frequency receive chain, comprising:
   generating the given power spectral density of noise, measuring a power spectral density of noise at an output of the wideband radio frequency receive chain, and computing a power gain of the wideband radio frequency receive chain as a function of the power spectral density of noise at the output of the wideband radio frequency receive chain and the equivalent power spectral density of noise returned at the input of the input block corresponding to the given power spectral density of noise generated in the generating step.

8. The device according to claim 7, wherein the wideband radio frequency receive chain has a specific background noise, and the power of the noise introduced by the noise source is greater than the power of the background noise specific to the wideband radio frequency receive chain.

9. The device according to claim 7, wherein the switching member is a switch configured to switch between a first position for injecting the input radio frequency signal, in the block of downstream circuits of the input block, and a second injection position for injecting noise generated by the noise source in the block of downstream circuits of the input block.

10. The device according to claim 7, wherein the noise source is a noise diode.

11. The device according to claim 7, wherein the spectral analyzer is a processing module belonging to the radio frequency processing assembly, the measurement of the power spectral density of noise at the output of the wideband radio frequency receive chain being obtained at the output of the processing module.

12. The device according to claim 7, further comprising an output block, connected to the output of the radio frequency processing assembly, comprising a switching member able to switch between a first position for conveying the radio frequency signal toward a primary output of the wideband radio frequency receive chain and a second position for conveying the radio frequency signal toward an auxiliary output of the wideband radio frequency receive chain, the spectral analyzer belonging to a calibrated auxiliary receiver connected, during the calibration, to the auxiliary output.

13. A radiogoniometry device comprising a plurality of wideband radio frequency receive chains, each connected to a receiving antenna, and a computation unit able to compute an angle of incidence of a radio frequency signal received by the receiving antennas, comprising, for each of the wideband radio frequency receive chains, a power calibration device according to claim 7.

* * * * *